US010605347B2

(12) United States Patent
Larson

(10) Patent No.: US 10,605,347 B2
(45) Date of Patent: Mar. 31, 2020

(54) RING CLIP ASSEMBLY

(71) Applicant: REELL PRECISION MANUFACTURING CORPORATION, St. Paul, MN (US)

(72) Inventor: George Larson, Roseville, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 512 days.

(21) Appl. No.: 15/268,258

(22) Filed: Sep. 16, 2016

(65) Prior Publication Data
US 2017/0074382 A1 Mar. 16, 2017

Related U.S. Application Data

(60) Provisional application No. 62/219,502, filed on Sep. 16, 2015.

(51) Int. Cl.
F16H 1/04 (2006.01)
F16H 55/17 (2006.01)
F16H 57/00 (2012.01)
F16H 19/04 (2006.01)

(52) U.S. Cl.
CPC .............. F16H 55/17 (2013.01); F16H 1/04 (2013.01); F16H 19/04 (2013.01); F16H 57/0025 (2013.01)

(58) Field of Classification Search
CPC ........... F16H 2057/125; F16H 57/0025; F16H 57/0031; F16H 55/14; F16B 2/20; F16B 2/22; F16B 2/24; F16B 2/241; F16B 2/243; F16B 2/205

USPC .... 74/411, DIG. 10, 439, 445, 440; 297/400
See application file for complete search history.

(56) References Cited

U.S. PATENT DOCUMENTS

| 351,936 A | 11/1886 | Pfingst |
|---|---|---|
| 1,166,551 A | 1/1916 | Simmons |
| 2,462,304 A | 2/1949 | Burdick |
| 2,605,926 A | 8/1952 | Casey |
| 3,030,783 A | 4/1962 | Schmidt |
| 3,213,500 A | 10/1965 | Thompson |
| 3,395,553 A | 8/1968 | Stout |
| 3,765,054 A | 10/1973 | Johnson |
| 4,190,929 A | 3/1980 | Palka |
| 4,227,283 A | 10/1980 | Mathewson et al. |
| 4,569,143 A * | 2/1986 | Bannister .............. E04B 2/7431 211/198 |
| 4,688,961 A | 8/1987 | Shioda et al. |
| 4,790,504 A | 12/1988 | Wills et al. |

(Continued)

FOREIGN PATENT DOCUMENTS

WO 9720125 6/1997
WO 02084056 10/2002

Primary Examiner — Victor L MacArthur
Assistant Examiner — Gregory Robert Weber
(74) Attorney, Agent, or Firm — Dicke, Billig & Czaja, PLLC

(57) ABSTRACT

One aspect is ring clip assembly including at least one ring clip having a ring portion surrounding an arm, the arm configured to define an aperture. The ring portion and the arm is separated thereby defining a slot between them. A shaft extends through the aperture in an interference fit, the arm configured to radially flex without contact from the ring portion. The ring portion has transmission elements on its outer perimeter configured to transmit movement to another member.

13 Claims, 8 Drawing Sheets

(56) References Cited

U.S. PATENT DOCUMENTS

| | | | |
|---|---|---|---|
| 4,916,968 A | 4/1990 | Kabaya | |
| 4,986,507 A | 1/1991 | Chiang | |
| 5,010,983 A | 4/1991 | Kitamura | |
| 5,018,244 A | 5/1991 | Hino | |
| 5,037,231 A | 8/1991 | Kitamura | |
| 5,041,818 A | 8/1991 | Liu | |
| 5,043,846 A | 8/1991 | Kinoshita | |
| 5,052,078 A | 10/1991 | Hosoi | |
| 5,064,137 A | 11/1991 | Komatsu | |
| 5,088,156 A | 2/1992 | Hosoi | |
| 5,108,062 A | 4/1992 | Detwiler | |
| 5,197,704 A | 3/1993 | Kitamura | |
| 5,211,368 A | 5/1993 | Kitamura | |
| 5,219,240 A | 6/1993 | Kitamura | |
| 5,231,734 A | 8/1993 | Rude | |
| 5,235,494 A | 8/1993 | Chang et al. | |
| 5,354,028 A | 10/1994 | Kitamura | |
| 5,364,149 A | 11/1994 | Aymerich et al. | |
| 5,491,874 A | 2/1996 | Lowry et al. | |
| 5,509,176 A | 4/1996 | Karl | |
| 5,697,125 A | 12/1997 | Gannon | |
| 5,787,755 A * | 8/1998 | Periou | F16D 3/52 464/84 |
| 6,301,748 B1 | 10/2001 | Su-Man | |
| RE37,712 E | 5/2002 | Gannon | |
| 6,467,129 B1 | 10/2002 | Bae | |
| 6,530,123 B1 | 3/2003 | Wahlstedt | |
| 6,561,333 B2 * | 5/2003 | Larson | F16D 7/021 192/33 C |
| 7,219,569 B2 * | 5/2007 | Jastrzembowski | F02N 15/023 74/7 E |
| 7,257,863 B2 | 8/2007 | Horng | |
| 7,607,202 B1 | 10/2009 | Lee | |
| 7,958,600 B2 | 6/2011 | Kuo et al. | |
| 8,245,356 B2 | 8/2012 | Chu et al. | |
| 8,621,951 B2 * | 1/2014 | Meier | F16D 1/116 74/409 |
| 8,875,348 B2 | 11/2014 | Kossett | |
| 9,132,756 B1 * | 9/2015 | Witte | B60N 2/847 |
| 9,296,565 B2 * | 3/2016 | Batchelder | B65G 15/62 |
| 9,527,672 B2 * | 12/2016 | Batchelder | B65G 21/06 |
| 9,598,244 B2 * | 3/2017 | Snabb | B65G 15/62 |
| 9,751,697 B2 * | 9/2017 | Ma | B65G 23/06 |
| 9,772,030 B2 * | 9/2017 | Palfai | F16H 57/12 |
| 10,144,329 B2 * | 12/2018 | Ogawa | B60N 2/853 |
| 2002/0144378 A1 | 10/2002 | Liao | |
| 2005/0066475 A1 | 3/2005 | Minami | |
| 2007/0094845 A1 | 5/2007 | Chang et al. | |
| 2007/0101543 A1 | 5/2007 | Lu et al. | |
| 2007/0283534 A1 | 12/2007 | Chang et al. | |
| 2008/0047101 A1 | 2/2008 | Petermann et al. | |
| 2009/0293229 A1 | 12/2009 | Chiang | |
| 2010/0242649 A1 * | 9/2010 | Vandewal | F16H 55/18 74/409 |
| 2011/0277574 A1 * | 11/2011 | Mitsuhashi | B60N 2/2252 74/411.5 |
| 2012/0174339 A1 | 7/2012 | Novin | |
| 2014/0059805 A1 | 3/2014 | Krahn et al. | |
| 2015/0047450 A1 * | 2/2015 | Mitchum | F16H 55/18 74/445 |
| 2015/0071735 A1 | 3/2015 | Jenum et al. | |
| 2016/0287248 A1 * | 10/2016 | Levin | A61B 17/00234 |
| 2017/0015423 A1 * | 1/2017 | Udriste | B60N 2/995 |

* cited by examiner

RING CLIP ASSEMBLY

CROSS REFERENCE TO RELATED APPLICATIONS

This Non-Provisional patent application claims the benefit of the filing date of U.S. Provisional Patent Application Ser. No. 62/219,502, filed Sep. 16, 2015, entitled "GEAR CLIP FRICTION DEVICE," which is herein incorporated by reference.

BACKGROUND

In many applications, it is useful to have friction torque or linear force resistance in combination with a variety of functional configurations. For example, it can be useful to have a so-called friction clip hinge, to provide high torque or linear force resistance in a relatively small package, coupled to a gear or gears, to provide smooth, predicable relative movement. Such combinations, however, can be difficult to accommodate in small package sizes, and can be complicated to assemble and construct. For these and other reasons, there is a need for the invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
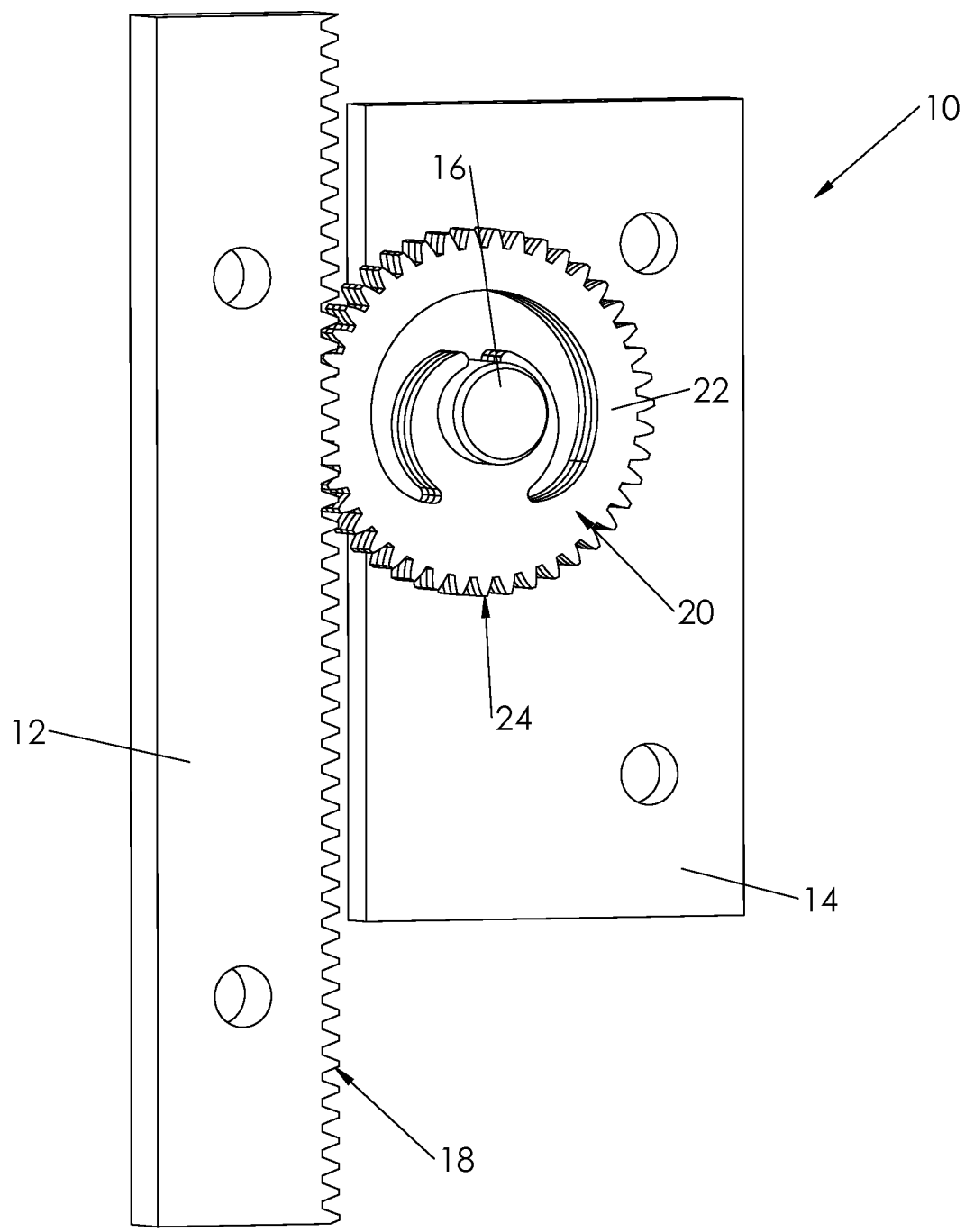
FIG. 1 is a perspective view of ring clip friction device in accordance with one embodiment.

FIG. 1 illustrates ring clip friction device 10 in accordance with one embodiment. In one embodiment, ring clip friction device 10 includes first member 12, second member 14 and ring clip assembly 20. First member 12 includes first member transmission elements 18 along at least one of its sides. Ring clip assembly 20 includes a plurality of ring clips 22 mounted over shaft 16, which in turn is fixed to, and extends from, second member 14. In one embodiment, each of ring clips 22 have ring clip transmission elements 24 on the outer edge of the ring clips 22.

In operation, ring clip assembly 20 affords a smooth linear force resistance profile with the relative linear movement of first and second members 12 and 14. In one embodiment, first member 12 is fixed or mounted to a stationary base. Second member 14 is then configured to move linearly relative to the stationary first member 12. Each of ring clips 22 are press fit over shaft 16, such that sufficient force must be applied to ring clip 22 to overcome its interference with shaft 16 in order to make ring clips 22 rotate over shaft 16. Ring clip transmission elements 24 are then engaged with first member transmission elements 18. In one embodiment, ring clip transmission elements 24 and first member transmission elements 18 are interlocking gear teeth, such as cycloidal, involute or sprocket teeth.

In this way, relative movement of first and second members 12 and 14 forces rotation of ring clips 22, and the torque generated by the interference between ring clips 22 and shaft 16 provides a relatively consistent and repeatable linear force profile that is useful in many applications. This favorable torque or linear force profile is achieved in a relatively streamlined package. Rather than have a torque device in one housing, and then connecting a power transmission device to the torque device, ring clip friction device 10 provides both the torque and transmission functionality in a relatively thin overall package.

Figure 2:
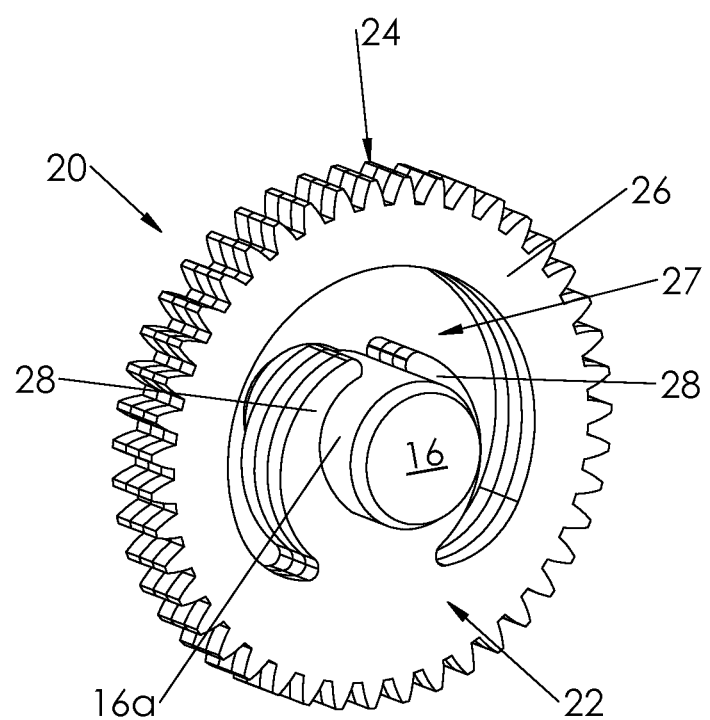
FIG. 2 is a perspective view of a ring clip assembly with multiple ring clips in accordance with one embodiment.
Figure 3:
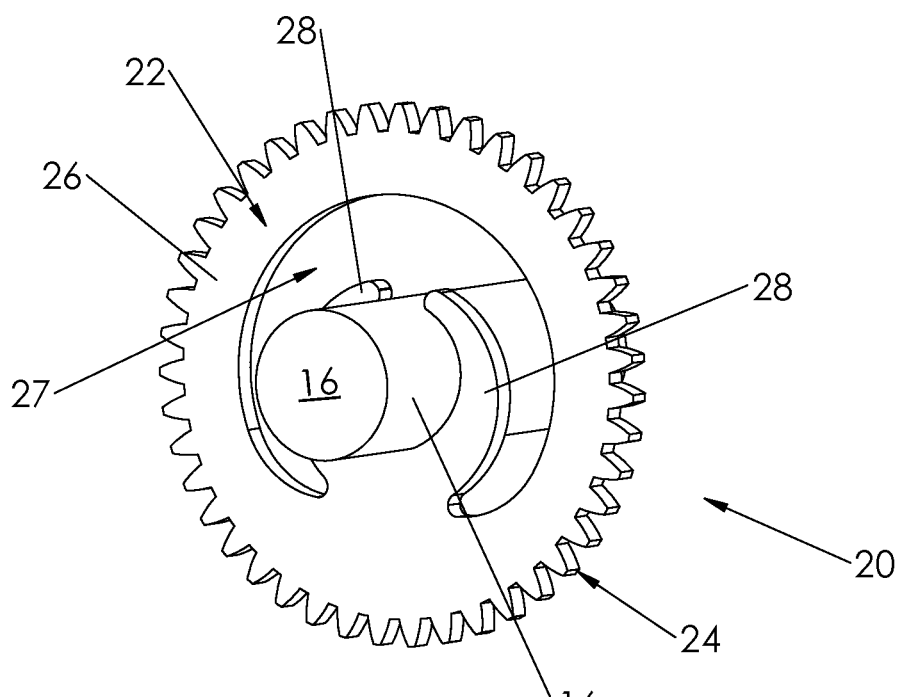
FIG. 3 is a perspective view of a ring clip assembly in accordance with one embodiment.

FIGS. 2 and 3 illustrate ring clip assembly 20 in accordance with one embodiment. Ring clip assembly 20 includes ring clips 22 and shaft 16. In the embodiment of FIG. 2, a plurality of ring clips 22 are mounted over shaft 16, and in the embodiment of FIG. 3, a single ring clip 22 is mounted over shaft 16. The number of ring clips 22 used in any ring clip assembly 20 can be varied in order to adjust the amount of torque generated in the particular application in which ring clip assembly 20 is used. The more ring clips 22 used, the more torque that will be generated in the ring clip assembly 20.

As illustrated in FIGS. 2 and 3, ring clips 22 include ring portion 26, arms 28, and slot 27 defined between ring portion 26 and arms 28. The outer surface 16a of shaft 16 has diameter greater than the diameter of the opening defined within arms 28, such that arms 28 are in an interference engagement with shaft 16. Ring clip transmission elements 24 are carried on the outer surface of ring portion 26 and configured for engagement with other transmission elements as previously described. In one embodiment, ring portion 26 forms a fully closed circle, thereby containing arms 28. In one embodiment, slot 27 extends radially around arms 28 sufficiently that arms 28 are allowed to fully flex without contact from the surrounding ring portion 26.

Because arms 28 are in an interference fit with shaft 16, arms 28 must be free to flex as ring clip 22 is installed onto and rotated about shaft 16 in order for torque assembly 20 to have a relatively consistent and repeatable torque profile over the entire rotation of ring clip 22. If arms 28 are constrained or do not have enough radial length, the torque profile of the assembly would be uneven, unpredictable, and non-repeatable.

Figure 4:
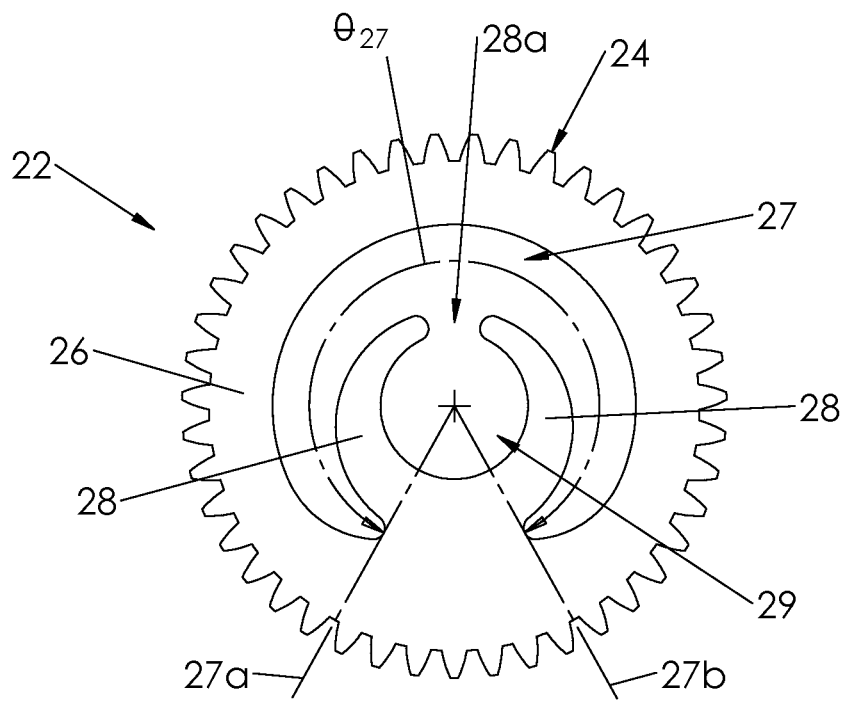
FIG. 4 is a front view of a ring clip in accordance with one embodiment.

FIG. 4 illustrates clip 22 in accordance with one embodiment. Ring clip 22 can be used in a ring clip assembly with a shaft, such as ring clip assembly 20 and shaft 16 in FIGS. 1-3. Ring clip 22 includes ring portion 26, arms 28, and slot 27. Ring clip transmission elements 24 are carried on the outer surface of ring portion 26. Ring portion 26 is a closed and circular shape, fully enclosing arms 28. Arms 28 define aperture 29 and are spaced apart by opening 28a. Arms 28 are spaced apart from ring portion 26 throughout the entire slot 27 between slot ends 27a and 27b. Outside slot 27, arms 28 and ring portion 26 are coupled together.

In one embodiment, slot 27 has a radial span $\theta_{27}$ configured to be long enough to ensure that the arms 28 have sufficient length within slot 27 to both substantially surround shaft 16 and to be free to radially flex without outer contact as shaft 16 rotates relative to ring clip 22. In the embodiment illustrated in FIG. 4, the radial span $\theta_{27}$ of slot 27 is configured to be 300° between slot ends 27a and 27b. As such, arms 28 can be configured with sufficient length to substantially surround shaft 16 in an interference fit, yet still be able to radially flex without contact with ring portion 26, which surrounds them.

If arms 28 are too short or configured to be attached or otherwise interfere with ring portion 26, then they will not have sufficient flex relative to shaft 16, and accordingly, the ring clip assembly will not have a smooth or predictable torque profile. In various embodiments, it has been found that the radial span $\theta_{27}$ of slot 27 must be configured to be at least 270° between slot ends 27a and 27b in order to afford ring clip assembly 20 with a relatively consistent and repeatable torque profile.

In one embodiment, ring clip 22 includes two arm sections 28, which are separated by opening 28a. When ring clip 22 includes two arm sections 28 in this way, providing opening 28a between them ensures that arms 28 are able to flex as shaft 16 rotates relative to ring clip 22. If a single arm 28 were to completely surround shaft 16 without an opening, ring clip assembly 20 would not have a consistent and repeatable torque or linear force resistance profile.

In one embodiment, each of arm sections 28, as illustrated for example in FIG. 4, is of equal length, such that ring clip produces substantially symmetrical torque or linear force resistance. In this way, resistance to the relative rotation of shaft 16 and clip 22 is substantially the same for either direction of relative rotation.

Figure 5A:
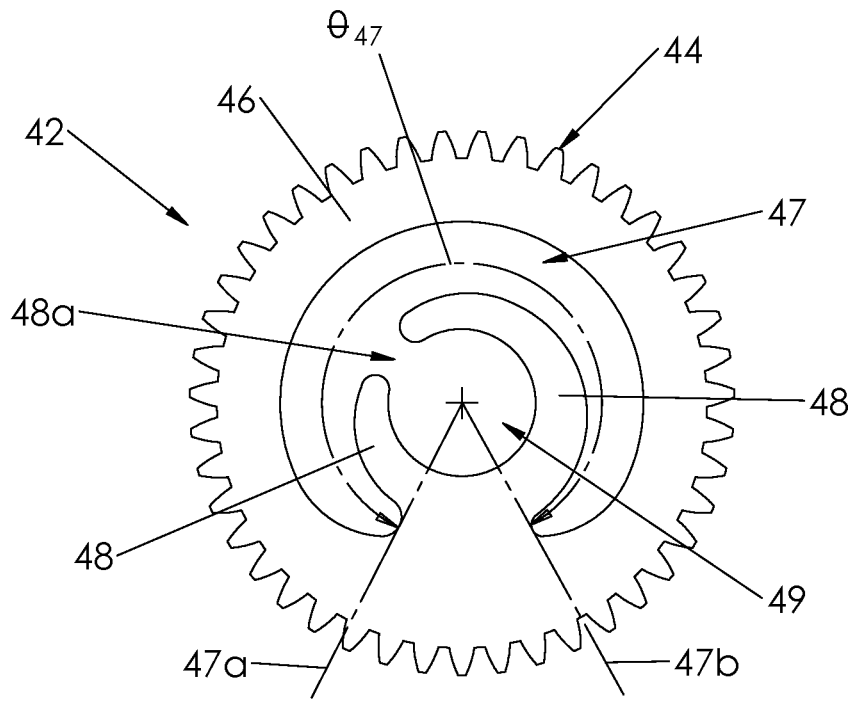
FIG. 5A is a front view of a ring clip in accordance with one embodiment.

FIG. 5A illustrates ring clip 42 in accordance with one embodiment. Ring clip 42 can be used in a ring clip assembly with a shaft, such as ring clip assembly 20 and shaft 16 in FIGS. 1-3. Ring clip 42 include ring portion 46, arms 48, and slot 47. Ring clip transmission elements 44 are carried on the outer surface of ring portion 46. Ring portion 46 is a closed circular shape, fully enclosing arms 48. Arms 48 define aperture 49 and are spaced apart by opening 48a. Arms 48 are spaced apart from ring portion 46 throughout the entire slot 47 between slot ends 47a and 47b. Outside slot 47, arms 48 and ring portion 46 are coupled together.

In one embodiment, similar to ring clip 22, slot 47 of ring clip 42 has a radial length $\theta_{47}$ configured long enough to ensure that the arms 48 have sufficient length within slot 47 to both substantially surround shaft 16 and to be free to radially flex without outer contact as shaft 16 rotates relative to ring clip 42. As such, arms 48 have sufficient length to substantially surround shaft 16 in an interference fit, yet still are able to radially flex without contact with ring portion 46, which surrounds them.

As illustrated in FIG. 5A, arms 48 are of unequal length on either side of opening 48a. As such, ring clip 42 generates "asymmetrical torque," that is, torque generated by rotation of shaft 16 within aperture 49 in one direction is not equal to the torque generated by rotation of shaft 16 within aperture 49 in the opposite direction. This asymmetrical torque profile may be useful in a variety of applications. For example, when ring clip 42 is used in a ring clip assembly that is attached to facilitate movement of one member to another and gravity will assists such movement in one direction and resists it in another, the asymmetrical torque profile may be useful to provide a more overall balanced system performance.

In one embodiment, ring clip transmission elements 44 are interlocking gear teeth, such as cycloidal, involute or sprocket teeth. In other embodiments, ring clip transmission elements 44 are a smooth outer surface that frictionally locks with other transmission elements to transmit power to or from ring clips 42.

Figure 5B:
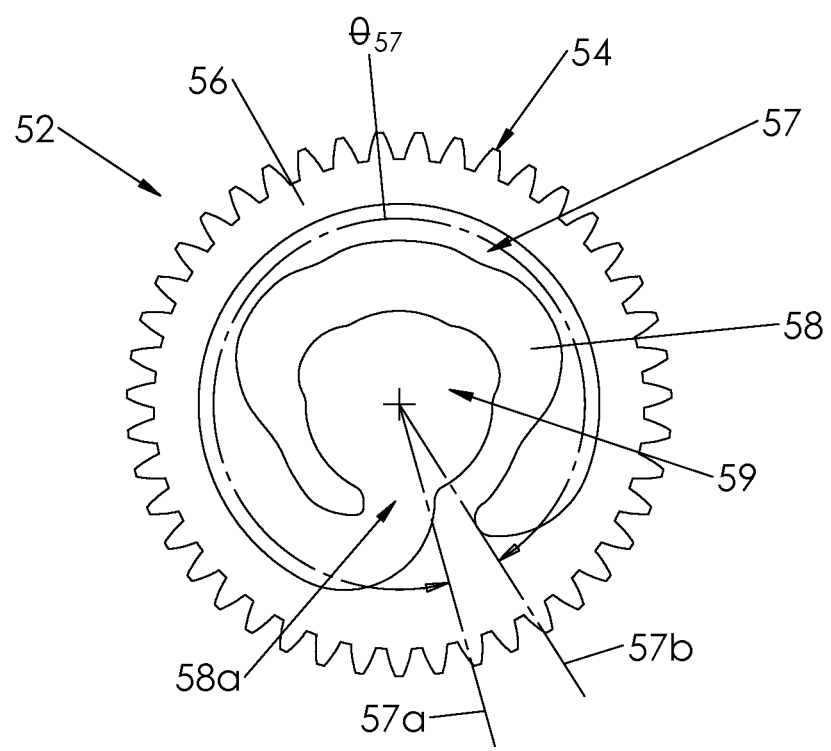
FIG. 5B is a front view of a ring clip in accordance with one embodiment.

FIG. 5B illustrates ring clip 52 in accordance with one embodiment. Ring clip 52 can be used in a ring clip assembly with a shaft, such as ring clip assembly 20 and shaft 16 in FIGS. 1-3. Ring clip 52 include ring portion 56, arm 58, and slot 57. Ring clip transmission elements 54 are carried on the outer surface of ring portion 56. Ring portion 56 is a closed circular shape, fully enclosing arm 58. Arm 58 defines aperture 59 and further defines an opening 58a. Arm 58 is spaced apart from ring portion 56 throughout the entire slot 57 between slot ends 57a and 57b. Outside slot 57, arm 58 and ring portion 56 are coupled together.

In one embodiment, similar to ring clips 22 and 42, slot 57 of ring clip 52 has a radial span $\theta_{57}$ configured long enough to ensure that arm 58 has sufficient length within slot 57 to both substantially surround shaft 16 and to be free to radially flex without outer contact as shaft 16 rotates relative to ring clip 52. As such, arm 58 has sufficient length to substantially surround shaft 16 in an interference fit, yet still is able to radially flex without contact with ring portion 56, which surrounds it. Ring clip 52 also includes an arm 58 where the opening 58a is provided in an unbalanced location and with an uneven width. As with ring clip 42 above, this unique configuration is useful in many applications.

Figure 6:
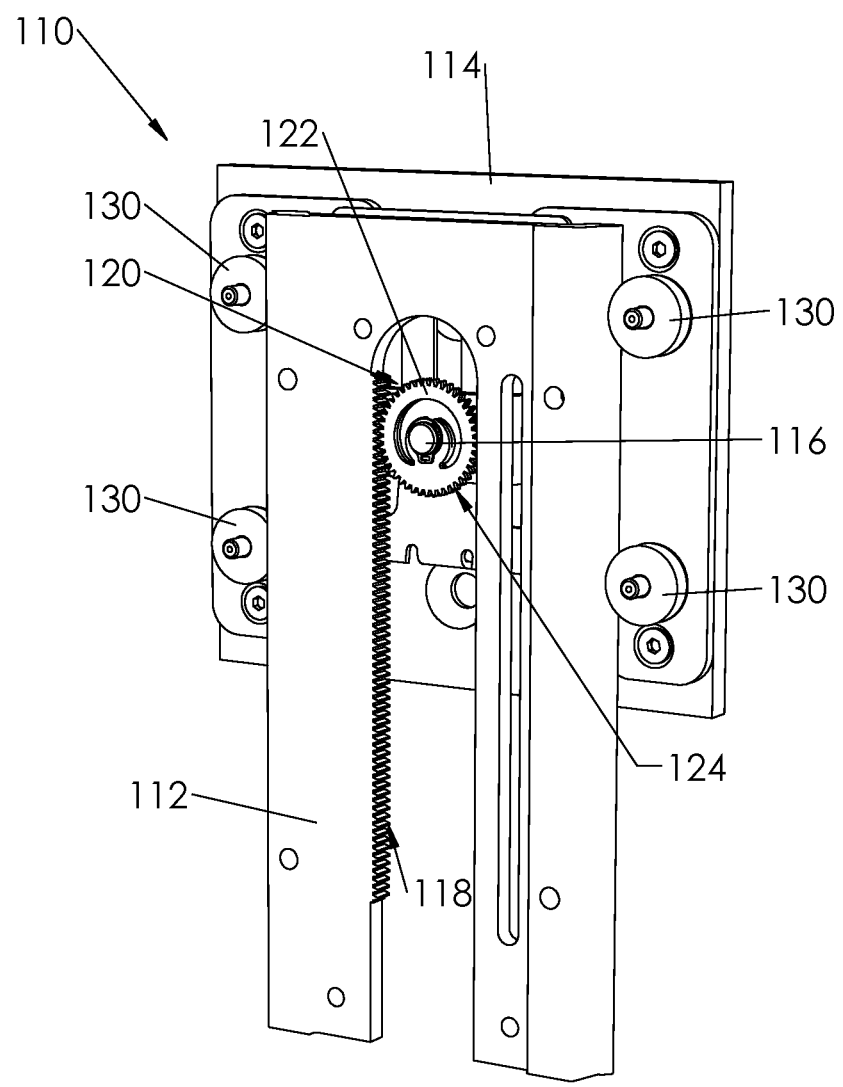
FIG. 6 is a perspective view of ring clip friction device in accordance with one embodiment.

FIG. 6 illustrates ring clip friction device 110 in accordance with one embodiment. In one embodiment, ring clip friction device 110 includes first member 112, second member 114 and ring clip assembly 120. First member 112 includes first member transmission elements 118 along at least one of its sides. Ring clip assembly 120 includes a plurality of ring clips 122 mounted over shaft 116, which in turn is fixed to, and extends from, second member 114. In one embodiment, each of ring clips 122 have ring clip transmission elements 124 on the outer edge of the ring clips 122. In one embodiment, rollers 130 are mounted to second member 114 and are located on either side of first member 112 thereby securing first member between rollers 130.

In one embodiment, first member 112 is, or is secured to, a seat back and second member 114 is a head rest for the seat back. The outer edges of first member 112 are secured between rollers 130, which in turn are mounted to second member 114 such that second member 114 (the headrest) can be adjusted up and down relative to first member 112 (the seat). Ring clip assembly 120 is then coupled between first and second members 112 and 114 in order to give a relatively consistent and repeatable linear force resistance/ user force profile during that up-and-down adjustment.

Shaft 116 is fixed to second member 114 and one or more ring clips 122 are pressed over shaft 116. The ring clip transmission elements 124 on the outer edge of the ring clips 122 are mated with the first member transmission elements 118 of first member 112. In one embodiment, the respective transmission elements are gear teeth. In this way, relative movement of first and second members 112 and 114 forces movement of ring clip transmission elements 124 by first member transmission elements and rotates ring clips 122 over shaft 116. This produces relatively consistent and repeatable torque or linear force resistance between first and second members 112 and 114 as they move relative to each other.

Ring clip assembly 120 may include any of a variety of ring clips, such as any of ring clips 22, 42 and 52 described above. Ring clip 22 has symmetrical arms 28 of equal length and will provide the same force in either direction, up or down. Ring clips 42 and 52 may be desirable in some embodiments, especially where second member 114 (the headrest) has substantial weight. As such, it may be desirable for torque or linear force resistance assembly to have asymmetrical torque or linear force resistance such that it takes more force to move second member 114 down than it takes to move it up. Although ring clip assembly 120 is illustrated coupled between a seat and headrest in FIG. 6, the predictable torque or linear force resistance profile that it provides is useful in a variety of application moving one member relative to another.

Figure 7:
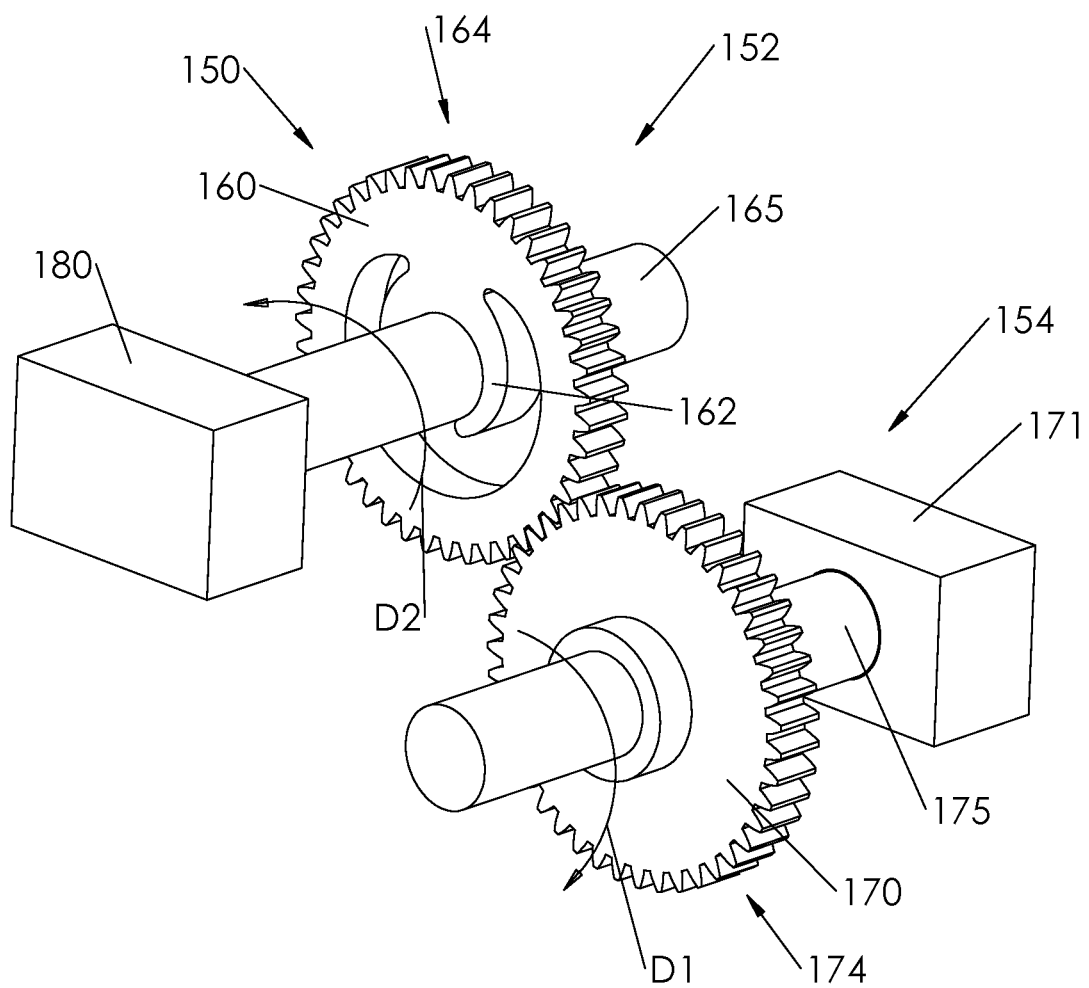
FIG. 7 is a perspective view of ring clip friction device in accordance with one embodiment.

FIG. 7 illustrates ring clip friction device 150 in accordance with one embodiment. In one embodiment, ring clip friction device 150 includes ring clip assembly 152 and input assembly 154. Ring clip assembly 152 includes a ring clip 160 mounted over output shaft 165, ring clip 160 having ring clip transmission elements 164 on its outer periphery and having arms 162 in an interference fit with output shaft 165. In one embodiment, input assembly 154 includes an input gear 170 fixed to input shaft 175, input gear 170 having gear teeth 174 on its outer periphery. Ring clip friction device 150 may include any of a variety of ring clips, such as any of ring clips 22, 42 and 52 described above.

In one embodiment, ring clip friction device 150 is configured as a torque transmission overload device. In operation, input assembly 154 is coupled to an input source 171, such as a motor, via input shaft 175, which rotates input gear 170 in first direction D1. Because the respective transmission elements 174 and 164 of input gear 170 and ring clip 160 are meshed, this rotates ring clip 160 in second direction D2. Rotation of ring clip 160 in turn drives output shaft 165 and any output 180 that is coupled to output shaft 165. During operation, however, if the output 180 becomes jammed or otherwise is impinged, ring clip assembly 152 provides overload protection. If output shaft 165 cannot rotate due to the output 180 not moving, shaft 165 will then slip relative to ring clip 160 thereby providing overload protection. Such overload protection is useful in a variety of applications and this embodiment allows advantages over existing technology.

In various other embodiments, input assembly 154 may include a timing belt or sprocket coupled to input shaft 175. The timing belt or sprocket can be configured to engage transmission elements 164, such that ring clip 160 tends to rotate with the rotation of the timing belt or sprocket.

Figure 8:
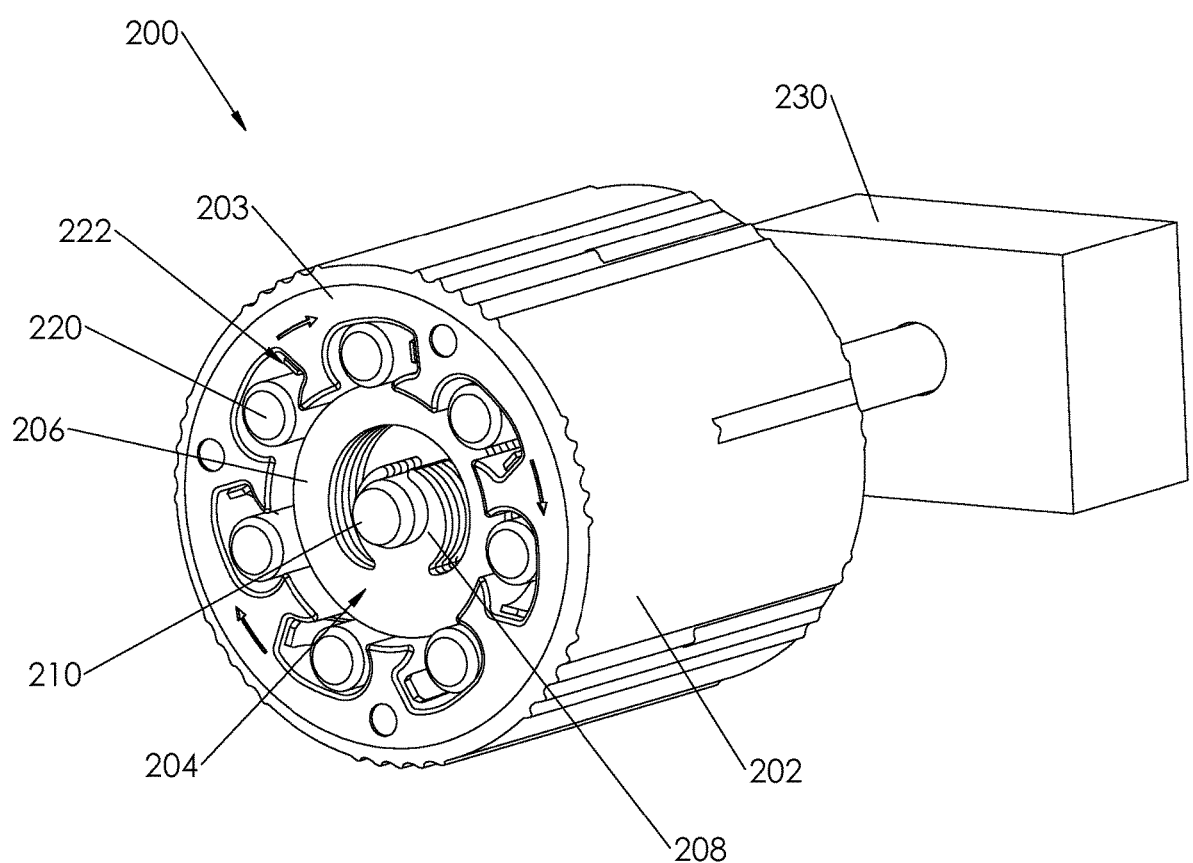
FIG. 8 is a perspective view of ring clip friction device in accordance with one embodiment.

FIG. 8 illustrates ring clip friction device 200 in accordance with one embodiment. In one embodiment, ring clip friction device 200 includes one-way roller assembly 202 and ring clip assembly 204. One-way roller assembly 202 includes roller housing 203 and a plurality of rollers 220, each of which are configured within ramped slots 222 formed in roller housing 203. Ring clip assembly 204 is configured within roller housing 203 and includes a plurality of ring clips 206, each having arms 208, which are mounted over shaft 210 in an interference fit. Ring clip friction device 200 may include any of a variety of ring clips, such as any of ring clips 22, 42 and 52 described above.

In operation, ring clip friction device 200 operates as a torque differential device. When the roller housing 203 is rotated in the direction opposite that of the arrows appearing on the housing while shaft 210 is coupled to output 230, each of the plurality of rollers 220 will freely roll over the outer clip periphery that is formed from the collective outer surfaces of the plurality of ring clips 206 that are stacked over shaft 210. Ramped slots 222 are configured on one side to allow the plurality of rollers 220 to freely roll in the direction opposite the arrows.

When the roller housing 203 is rotated in the direction of the arrows appearing on the housing while shaft 210 is coupled to output 230, however, the plurality of rollers 220 are configured to engage the ramped slots 222 in such a way that the rollers 220 will lock in place and will no longer rotate. As such, as roller housing 203 continues to rotate in this direction after the plurality of rollers 220 are locked, the plurality of rollers 220 grip the outer periphery of the ring clips 206 and thereby rotate the ring clips 206 relative to the shaft 210.

In this way, rotation of roller housing 203 relative to shaft 210 and output 230 in the direction opposite of the arrows produces relatively low torque and resistance to rotation, whereas rotation in the direction of the arrows produces relatively high torque and resistance to rotation. Such a differential rotational torque or linear force resistance of housing 203 to output 230 is useful in a variety of applications.

As evident from ring clip friction device 200, ring clip assembly 204 does not need to be configured with teeth on its outer surface to function in accordance with the embodiments to transmit rotation of ring clips to other elements. Transmission elements other that gear teeth on the outer perimeter of the ring clips are also possible, such as friction contact of the circular profile of the ring clip to other elements, timing belt teeth, splines, and chain sprocket teeth.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A ring clip assembly comprising:
 at least one ring clip comprising a ring portion surrounding an arm portion, the arm portion configured to define an aperture;
 wherein the ring portion and the arm portion are separated thereby defining a slot between them; and a shaft having a circumference and extending through the aperture in an interference fit such that relative rotation of the shaft and ring clip along all locations of the shaft circumference produces consistent torque, the arm portion configured to radially flex without contacting the ring portion;

wherein the ring portion has transmission elements on its outer perimeter configured to transmit movement to another member.

2. The ring clip assembly of claim 1, wherein the slot has a radial span greater than 270 degrees, relative to a radial center of the slot.

3. The ring clip assembly of claim 1, wherein the slot has a radial span greater than 300 degrees, relative to a radial center of the slot.

4. The ring clip assembly of claim 1, wherein the arm portion substantially surrounds the shaft.

5. The ring clip assembly of claim 1, wherein the transmission feature is at least one of gear teeth, timing belt teeth, splines, chain sprocket teeth and a friction contact profile.

6. The ring clip assembly of claim 1, wherein the assembly is configured to produce balanced torque or linear force resistance.

7. The ring clip assembly of claim 1, wherein the assembly is configured to produce asymmetrical torque or linear force resistance.

8. A ring clip friction device comprising:
   at least one ring clip comprising a ring portion surrounding an arm portion, the arm portion configured to define an aperture;
   wherein the ring portion and the arm portion are separated thereby defining a slot between them; and
   a shaft having a circumference and extending through the aperture in an interference fit such that relative rotation of the shaft and ring clip along all locations of the shaft circumference produces consistent torque, the arm portion configured to radially flex without contacting the ring portion;
   wherein the ring portion has ring transmission elements on its outer perimeter;
   a first member configured with first member transmission elements on at least one surface, the ring and first member transmission elements configured to engage each other; and
   a second member coupled to the shaft and configured to move relative to the first member.

9. The ring clip friction device of claim 8, wherein the slot has a radial span greater than 270 degrees.

10. The ring clip friction device of claim 8, wherein the first and second transmission features are gear teeth.

11. The ring clip friction device of claim 8, wherein the first member is or is coupled to a seat and the second member is or is coupled to a head rest, the ring clip and the shaft providing a consistent and repeatable torque and linear force resistance profile with the relative movement of the head rest and the seat.

12. The ring clip friction device of claim 8, wherein the first member comprises an input assembly, including an input shaft and an input gear, the first member transmission element comprising gear teeth on the input gear perimeter, and the second member comprising an output coupled to the shaft.

13. The ring clip friction device of claim 8, wherein the first member comprises a roller housing assembly, including roller housing and a plurality of rollers, the first member transmission element comprising the plurality of rollers, and the second member comprising an output coupled to the shaft.

* * * * *